Figure 1:
Figure 1:
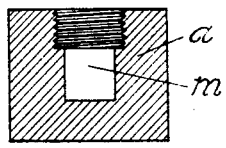

Sept. 3, 1929.  W. O. SNELLING  1,726,931

METHOD OF CALIBRATING WEIGHTS

Filed Jan. 12, 1926

Walter O. Snelling.
INVENTOR

Patented Sept. 3, 1929.

1,726,931

UNITED STATES PATENT OFFICE.

WALTER O. SNELLING, OF ALLENTOWN, PENNSYLVANIA.

METHOD OF CALIBRATING WEIGHTS.

Application filed January 12, 1926. Serial No. 80,722.

My invention relates to improvements in the manufacture of standards of mass or weight, and more particularly relates to an improved method of rapidly, cheaply, and accurately calibrating or standardizing weights for laboratory balances and for other purposes. One object of my invention is the preparation of sets of weights for chemical and other uses, of higher accuracy than has hitherto been obtainable, and another object of my invention is the preparation, at a reasonable cost, of sets of weights of an accuracy now only obtainable in very expensive sets.

In order that any set of weights may be used in refined weighing operations without correction factors, it is necessary that each weight should be accurate to the smallest unit employed in the weighing operation. In ordinary chemical analysis, for example, it is customary to weigh to one-tenth of a milligram, or one ten-thousandth of a gram, and although the smallest weight actually used in the sets of weights generally employed in chemical analysis is one centigram (and even in sets of weights of very high accuracy is only one milligram), fractions of a milligram can be accurately determined by the use of a "rider" on the balance arm in the well known way. It will of course be evident, however, that reading the weight of an object to be weighed to one ten-thousandth of a gram is meaningless if any of the weights differ from the assumed standard by this amount or more. Actually, the small weights in most good sets of weights are accurate to one ten-thousandth of a gram, but difficulties in manufacture up to this time have prevented the larger weights (100 gram or higher) from having such accuracy except in the case of quite expensive sets of weights, and even in the case of very high grade weights, a tolerance of five ten-thousandths of a gram is allowed in 100 gram weights, and three ten-thousandths of a gram is allowed in 50 gram weights. Weights higher than 100 grams are rarely accurate to a milligram, and by the customary methods of manufacture (such as making the weight slightly over the desired weight, and then removing minute portions of metal with a file until the desired weight is obtained) the cost of obtaining very high accuracy in the case of heavier weights has been quite prohibitive, many hours being often required to bring a 500 gram weight, for example, within a tolerance of a milligram, the repeated weighings between the individual filing operations making the operation of calibration very time-consuming and very expensive.

I have discovered a method by which laboratory weights can be calibrated readily and cheaply to an accuracy of from one part in one million to one part in ten million, under ordinary manufacturing conditions, and by my method I can obtain weights accurately calibrated to one part in ten million, at less cost than weights can be calibrated by known methods to one part in one hundred thousand. By my method, the maximum accuracy obtainable in the weights being calibrated is only limited by the accuracy of the scales employed in calibration, and with sufficiently accurate scales weights can be readily calibrated to one part in one hundred million.

My method of calibrating weights depends essentially upon first preparing a weight somewhat lighter than is desired in the finished weight, weighing this weight to determine the difference between its actual weight and the desired weight, and then measuring off a length of fine wire of known weight per unit of length to make up the difference between the actual and the desired weights. The measured length of wire used should preferably be slightly less than the desired weight, and upon weighing the weight together with the measured length of wire, to determine a new difference between the actual and the desired weight, and then measuring off a further length of a finer wire to again make up the difference between the actual and the desired weight, successive approximations of constantly increasing accuracy can be obtained.

Figure 2:
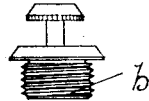
Figure 2:
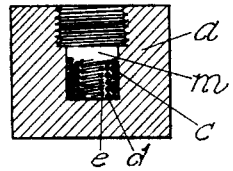
Figure 3:
Figure 3:
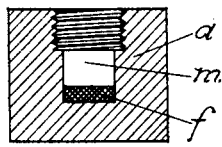
Figure 4:

In the accompanying drawings I have shown more or less diagrammatically one embodiment of the principles of the present invention, in which Figure 1 is a sectional view through a weight and the cover forming part thereof, Figure 2 shows the same weight and cover, after the measured lengths of calibrating wire have been inserted, Figure 3 shows the same weight as illustrated in Figure 2, after the wire has been melted, as in one modification of my invention, and Figure 4 shows one method of measuring off desired lengths of calibrating wire.

In Figures 1, 2 and 3, "$a$" is the body portion of one form of weight made in accordance with my present invention, "$b$" is a cover portion, and "$m$" is a cavity, within which measured lengths of calibrating wire may be inserted. In Figure 2, "c", "d" and "e" represent cross-sections through calibrating wires of different diameter. In Figure 3, "f" represents a fused mass of calibrating wire. In Figure 4, "w" represents a wire of uniform cross-section and known weight per unit of length, "g" represents a scale, the divisions of which correspond to fractions of a unit of weight of the wire "w", and "h" represents a cutting means of any desired type, for the purpose of cutting off a predetermined length of the wire "w".

In the practice of my invention, I prefer to employ hollow weights as illustrated in Figure 1, the weights comprising a body section and a cover section, the body section being provided with a cavity of appropriate size and shape. The body section and the cover section may be made of any appropriate metal or material, and should be of slightly less weight than is desired in the finished weight. Taking as an example the manufacture of a 100 gram weight, in a set of weights in which an accuracy of one part in one million is desired, and accordingly in which all measurements of weight will be determined in the course of manufacture to ten-thousandths of a gram, this weight might weigh 99.2876 grams, it being relatively simple to prepare by ordinary machine operations the parts of such a weight so as to obtain an accuracy within one part in one hundred, or one gram in one hundred grams.

Having made the body section and the cover section of the weight, preferably in quantity on an automatic lathe, and having weighed one body portion and one cover portion, and found their combined weight to be 99.2876 grams as in the above example, the weight so obtained is subtracted from the desired weight, or 100.0000 grams, and a difference of .7124 grams is found. A wire of some suitable metal, of which tin may be taken as an example, the wire being drawn so as to weigh approximately 10 grams in one meter of length, is next taken, and a length of this wire is measured off to the nearest centimeter to represent the desired compensation weight of .7000 grams, the length measured off will accordingly be 7 centimeters. If the wire weighed exactly 10 grams per meter of length, and if the wire were absolutely uniform in diameter and in density, the combined weight of the body portion, cover portion and wire would now be 99.9876 grams. Although wire can be drawn with great uniformity, the weight of a given length of wire cannot be assumed to as high an accuracy as one part in one million, and accordingly the body portion of the weight, the cover portion, and the measured length of wire are now weighed together. If we assume the weight as actually determined to be 99.9837 grams, this weight is subtracted from 100.0000 grams, and a difference of .0163 grams is found. A finer wire, weighing one gram per meter of length is next taken, and a length of this wire is measured off to the nearest millimeter, 16 millimeters of the wire being taken. The body portion and cover portion of the weight, the first piece of wire, and the second piece of wire, are now weighed together, and for purposes of example we may assume that the collective weight of the four portions is 99.9995 grams. This weight is then subtracted from the desired weight of 100.0000 grams, and a difference of .0005 grams is found. A still finer wire, weighing one-tenth of a gram per meter of length is then taken, and 5 millimeters of this wire is then measured off, and is added to the other portions of wire and to the body portion and cover portion of the weight. It is convenient, but not essential, to have the calibrating wires of such weight per unit of length that the portions cut off in calibration will not be longer than 150 millimeters, or less than 3 millimeters.

In the illustration just given, convenient sizes of wire have been described for the purpose of making the operation quite clear, but in actual use it is more convenient to employ wire of commercial grades, using a scale in which the divisions of length correspond to desired differences in weight. It is not possible to obtain wire that weighs exactly one gram per meter of length, but wire of great uniformity is commercially available, and it is relatively simple to determine the length of such wire that corresponds to one gram, and then to prepare a scale in which this weight is divided into 100 parts, or into any other desired number of parts, and in commercial manufacture I prefer to employ this method of measuring my wire.

When it is remembered that wire is commercially available that weighs less than .005 grams per meter, and that the operation of measuring the length of wire may be easily conducted to an accuracy of one-half of one millimeter, it will be seen that by the proposed method it is a relatively simple matter to calibrate a weight to .000003 grams, and by known methods wire weighing less than .0001 grams per meter can be obtained, and can be accurately measured by precise methods to .1 millimeter, giving a calibrating accuracy under these conditions of .00000001 grams. As has been already mentioned, experience has indicated that the accuracy of my method is limited only by the accuracy with which the weighings of the weight may be conducted, and it has been found quite simple to calibrate weights to one part in one hundred million, and very much higher accuracy can be obtained if desired.

I am aware that in certain forms of scales chain, cord or like material has long been used in weighing operations, a weight being balanced by raising from a support a length of chain, cord, cord with attached weights, or the like, until balance is secured. My invention is quite distinct from all such earlier applications of chain, cord, or the like, in that I detach or cut off my calibrating wire or material, to form a part of my weight, and the object of my invention is quite distinct from a weighing operation itself, and relates to the preparation of objects or weights of known mass, each weight carrying as a part of itself a detached or "cut off" portion of a weight-calibrating material.

It will of course be evident that the body portion and the cover portion of the weights, as well as the wires used in calibration, should be relatively permanent in the air. In addition to platinum, the unalterability of which gives it many points of advantage in the manufacture of weights, I have found that many of the special corrosion-resisting alloys now commercially available may be employed to advantage in the manufacture of weights by my new method. I have also found that for cheaper weights I can use body portions and cover portions of brass, plated with gold, platinum or chromium, the use of platings of both gold and platinum for weights being old in the art. For my calibrating wire I can use any convenient metal or material that is available in the form of wire, and it will of course be evident that a filiform condition is not absolutely essential, as I may with equal success employ a length of metal or material in the form of a flattened ribbon, or in any other suitable extended form, instead of using a wire of round cross-section.

For reasons of cheapness, I may employ wire of pure tin for my coarser calibration material, and of aluminum for my finer calibration material. If base materials are employed as my calibration material, suitable sealing of the body portion and the cover portion of my weights is desirable, and for this purpose I have successfully employed a sealing composition that I introduce into the opening or well of my weight before final calibration, and which I solidify by suitable treatment after the calibration of the weight has been completed. As an example of this modification of my invention I may introduce a solid but fusible resinous material into the cavity of my weight prior to the calibrating operations as herein described, and after completing the calibrating operations and inserting the various lengths of wire necessary to bring the weight of the body portion, the cover portion and the sealing material to the desired weight, I next invert my weight, and heat it to a temperature at which the sealing composition will be fluid, and by penetrating by capillarity into the threads between the body portion and the cover portion of the weight, will seal same properly together. It will of course be evident that I may employ other methods of sealing my weights, and of securing suitable adhesion between the portions of wire and the body portion of my weight. When a readily fusible calibrating wire is used, the wall surface of the "well" in the body portion of my weight may conveniently be roughened, and after the calibration of the weight has been completed, the temperature of the weight may be brought above the melting point of the readily fusible wire. A weight so prepared is shown in Figure 3, and by simple modification of the screw portion of the weight, a fusible metal as described may be used both as a calibrating means and as a sealing means, in this case the weight of course being inverted before bringing the calibrated weight to the fusion temperature of the fusible filiform calibrating material.

It will be evident that many changes may be made without departing from the essential principles of my invention, and accordingly no limitations should be imposed except as indicated in the appended claims.

I claim:

1. The method of calibrating weights which comprises adding to a weight a plurality of measured lengths of wire of different diameters of known weight per unit of length.

2. In the calibration of weights, the process which comprises adjusting the weight of an object by adding thereto a measured length of a wire of known weight per unit of length.

3. A weight comprising a body portion containing a cavity, a cover, and a measured length of wire of known weight per unit of length.

4. A weight comprising a body portion, a cover portion, and a plurality of measured lengths of wire of different known weights per unit of length.

In testimony whereof, I have hereunto subscribed my name this 6th day of January, 1926.

WALTER O. SNELLING.